US012766683B2

(12) United States Patent
Brodhead

(10) Patent No.: US 12,766,683 B2
(45) Date of Patent: Oct. 20, 2026

(54) FASTENER TOOLS AND METHODS

(71) Applicant: The Boeing Company, Arlington, VA (US)

(72) Inventor: James E. Brodhead, Everett, WA (US)

(73) Assignee: The Boeing Company, Arlington, VA (US)

(*) Notice: Subject to any disclaimer, the term of this patent is extended or adjusted under 35 U.S.C. 154(b) by 309 days.

(21) Appl. No.: 18/443,599

(22) Filed: Feb. 16, 2024

(65) Prior Publication Data

US 2025/0262733 A1 Aug. 21, 2025

(51) Int. Cl.
*B25B 31/00* (2006.01)

(52) U.S. Cl.
CPC .................................. *B25B 31/005* (2013.01)

(58) Field of Classification Search
CPC ......... B25B 13/10; B25B 13/12; B25B 13/44; B25B 13/46; B25B 13/48; B25B 13/50; B25B 13/5008; B25B 13/5016; B25B 13/5066; B25B 23/02; B25B 23/08; B25B 23/103; B25B 31/005; A61B 17/861; A61B 17/8886
See application file for complete search history.

(56) References Cited

U.S. PATENT DOCUMENTS

| | | | | |
|---|---|---|---|---|
| 2,613,942 | A | 10/1952 | Saunders | |
| 4,732,059 | A * | 3/1988 | Bonner | B25B 13/44 81/53.2 |
| 2006/0175770 | A1 * | 8/2006 | Linzell | B25B 23/0035 279/71 |
| 2022/0304735 | A1 | 9/2022 | Wahl | |

FOREIGN PATENT DOCUMENTS

| | | | |
|---|---|---|---|
| DE | 938420 | * | 1/1956 |
| DE | 938420 C | | 1/1956 |
| DE | 9312316 | * | 6/1994 |

OTHER PUBLICATIONS

European Patent Office, “Invitation pursuant to Rule 62a(1) EPC,” App. No. 24 221 765.1 (May 30, 2025).
European Patent Office, Extended European Search Report, App. No. 24221765.1 (Sep. 11, 2025).

* cited by examiner

*Primary Examiner* — Robert J Scruggs
(74) *Attorney, Agent, or Firm* — Walters & Wasylyna LLC

(57) ABSTRACT

A tool for installing and/or removing a fastener includes a body having an opening having a center axis. The tool includes a plurality of grips coupled to the body and angularly spaced apart from each other around the opening. At least one of the grips is radially movable relative to the opening. The tool includes a plurality of lugs coupled to the body. The lugs limit radially inward movement of the at least one of the grips. The tool includes a cam coupled to the body. Rotation of the cam about the central axis in a first rotational direction relative to the body moves the at least one of the grips radially inward. Pins and lugs serve to prevent escapement of the grips, which constitute a foreign object debris that may cause mechanical or electrical damage.

20 Claims, 10 Drawing Sheets

FASTENER TOOLS AND METHODS

FIELD

The present disclosure relates generally to fastener installation and removal and, more particularly, to devices and methods for installing and removing fasteners, such as temporary fasteners.

BACKGROUND

Various industries, such as aerospace, utilize specialized fasteners to temporarily, or permanently, retain certain components. For example, it is frequently necessary for parts to be temporarily joined together during manufacture or assembly using special fasteners that are removable and reusable. In the aerospace industry, such temporary fasteners are widely used in the manufacture and repair of aircraft, for example, to temporarily fasten sheets of material together or to align and hold parts, such as stiffeners, frames, etc., together before they are permanently joined. One example of such a temporary fastener is commonly referred to as a "Cleco" fastener. These Cleco fasteners generally include a cylindrical body, a plunger at one end, and expandable prongs or jaws at the opposing end, which are typically activated by an internal spring or threaded shaft. The prongs or jaws expand on the far side of the workpieces and then draw and clamp them together while maintaining a desired alignment and preventing distortion of the workpieces.

The spring-type fasteners are typically installed and removed using special hand-operated pliers or pneumatic power tools. However, the threaded-type fasteners are typically installed and removed by hand or using a hand-operated ratchet tool, such as a roller clutch. However, these hand tools have operational limitations, require lubrication, and are not designed for repeated removal and reinstallation. Further, installation and removal of the threaded-type fasteners can put a user's hand, wrist, and arm at awkward angles. Additionally, it can be increasingly difficult to install and remove the fasteners when the fasteners are used in tight or inaccessible areas. Thus, there exists a need for improved tools for rotating fasteners and for improved methods for installing and removing fasteners. Accordingly, those skilled in the art continue with research and development efforts in fastener utilization.

SUMMARY

Disclosed are examples of a tool and a method for installing and removing a fastener. The following is a non-exhaustive list of examples, which may or may not be claimed, of the subject matter according to the present disclosure.

In an example, the disclosed tool includes a body having an opening and a center axis. The tool includes a plurality of grips that are coupled to the body and angularly spaced apart from each other around the opening. At least one of the grips is radially movable relative to the opening. The tool includes a plurality of lugs that are coupled to the body. The lugs limit radially inward movement of the at least one of the grips. The tool includes a cam that is coupled to the body. Rotation of the cam about the central axis in a first rotational direction relative to the body moves the at least one of the grips radially inward.

In another example, the disclosed tool includes a body having a center axis. The body includes a first frame. The first frame includes a first opening that is concentric with the center axis. The body includes a second frame that is coupled to the first frame. The second frame includes a second opening that is concentric with the center axis. The tool includes a plurality of grips that are disposed between the first frame and the second frame and angularly spaced apart from each other around the center axis. The tool includes a plurality of lugs that extend between the first frame and the second frame. The tool includes a ring that is coupled to the body and concentric with the center axis. The tool includes a cam that is coupled to the ring and extends radially inward. The grips are radially movable relative to the center axis. The lugs limit radially inward movement of the grips. The ring is rotatable about the center axis relative to the body. Rotation of the ring about the central axis in a first rotational direction relative to the body engages the cam with the grips to move the grips radially inward.

In an example, the disclosed method includes steps of: (1) inserting a portion of a fastener in an opening of a body of a tool; (2) rotating a ring relative to the body in a first rotational direction about a center axis of the tool, wherein the ring is coupled to and concentric with the body; (3) moving a plurality of grips radially inward in response to rotating the ring, wherein the grips are coupled to the body and angularly spaced apart from each other around the opening; (4) engaging the portion of the fastener with the grips in response to moving the grips; (5) with the grips engaged with the portion of the fastener, further rotating the ring in the first rotational direction about the center axis; (6) rotating the body in the first rotational direction about the center axis in response to further rotating the ring; and (7) rotating the fastener in response to rotating the body.

Other examples of the tool and method will become apparent from the following detailed description, the accompanying drawings, and the appended claims.

DETAILED DESCRIPTION

Figure 1:
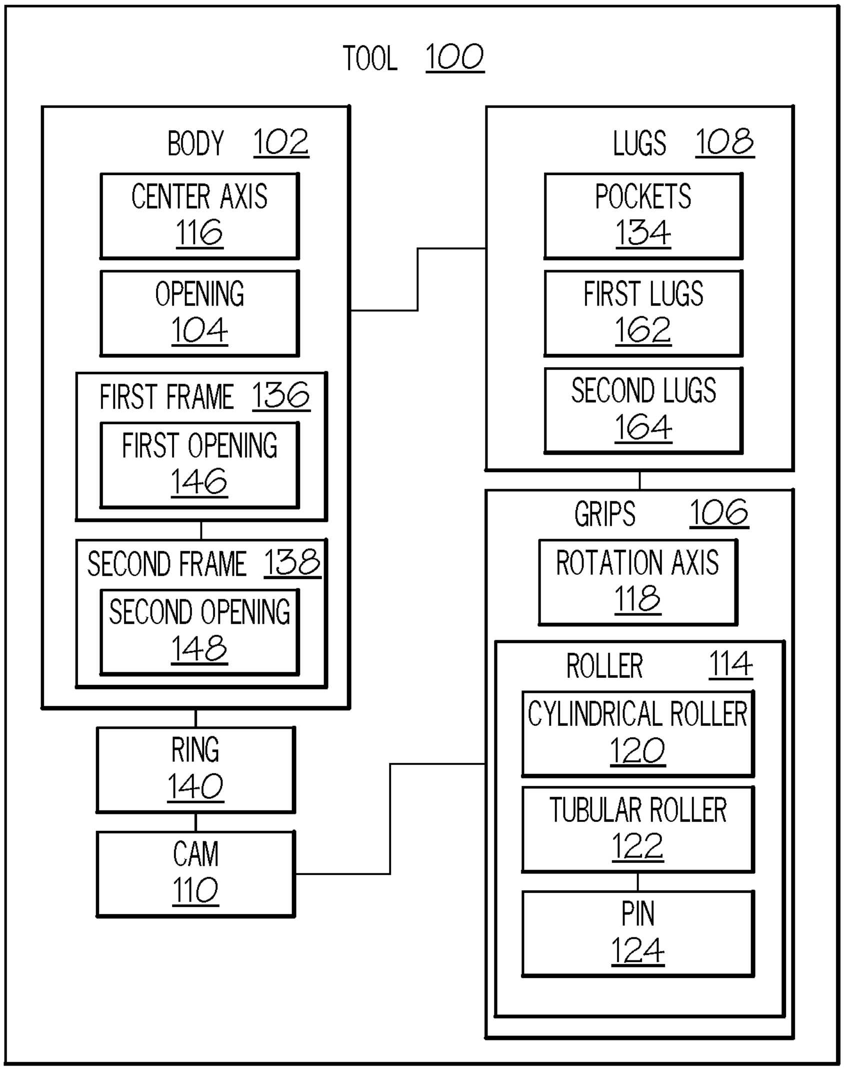
FIG. 1 is a schematic block diagram of an example of a tool for installing and removing fasteners.
Figure 8:
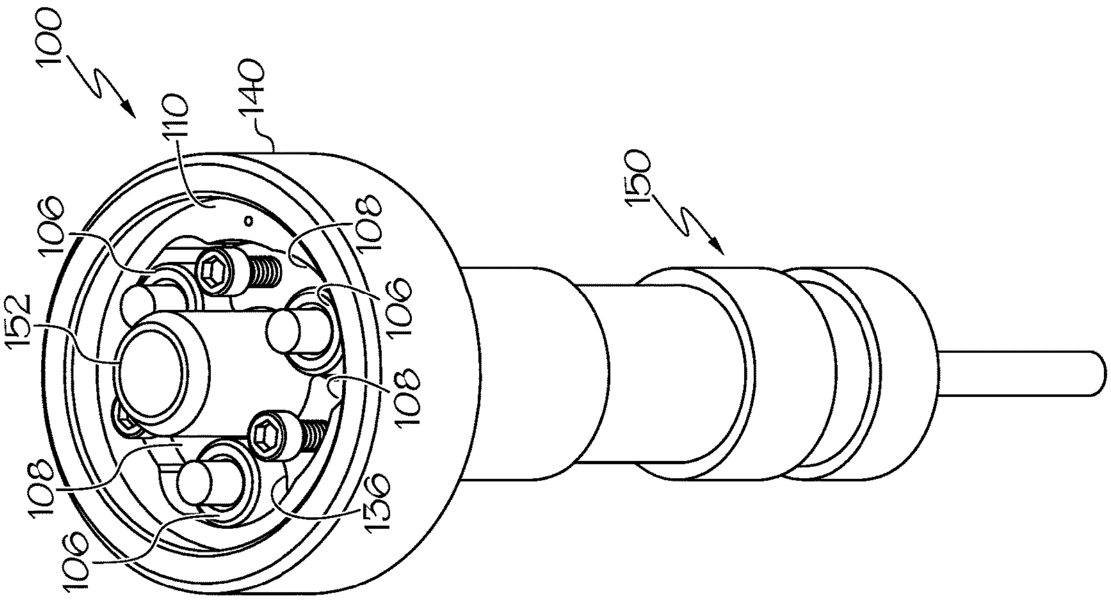
FIG. 8 is a schematic, perspective view of an example of a portion of the tool and the fastener.
Figure 7:
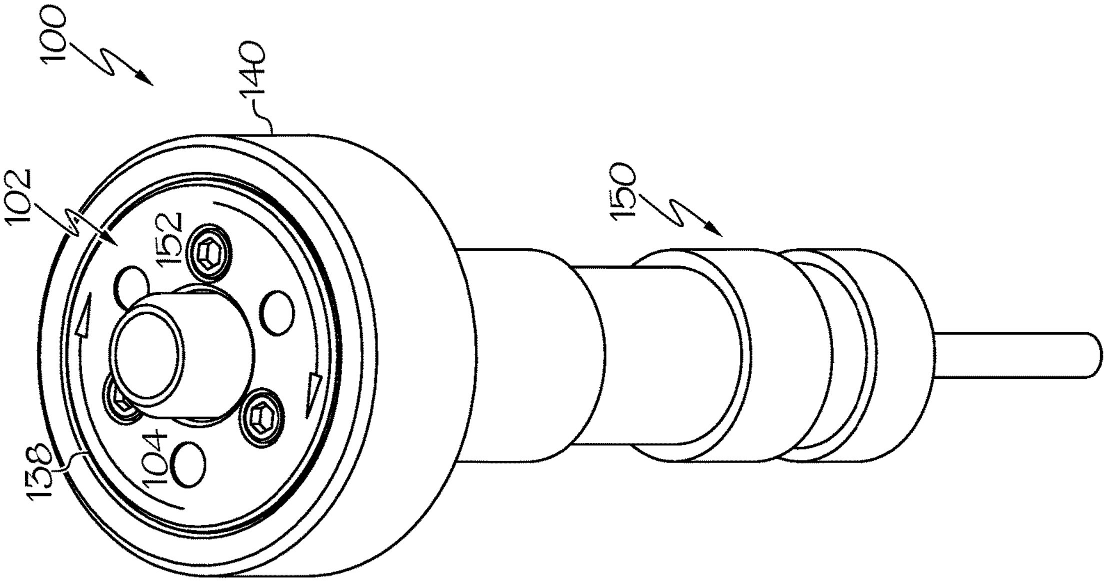
FIG. 7 is a schematic, perspective view of an example of the tool and a fastener.

Referring generally to FIGS. 1-13, by way of examples, the present disclosure is directed to a tool 100 and a method 1000 for installing and removing fasteners (e.g., fastener 150 in FIGS. 1, 7 and 8). The fastener 150 includes any type of fastener that is rotated to install and remove from one or more workpieces.

Examples of the fastener 150 include temporary fasteners used to temporarily align and hold components together, for example, during assembly, drilling of holes, installation of permanent fasteners, and the like. A particular example of this type of temporary, reusable fastener is commonly referred to as a Cleco fastener or skin pin. Generally, these Cleco-type temporary fasteners come in two variations, namely the spring-type in which prongs or jaws of the fastener are activated by an internal spring and the threaded-type in which the prongs or jaws of the fasteners are activated by rotation of an internal threaded shaft. Other examples of the fastener 150 include permanent fasteners (e.g., threaded fasteners) used to permanently couple or join components of an assembly together.

Examples of the tool 100 and method 1000 disclosed herein are primarily intended for use with these threaded-type temporary ("Cleco") fasteners, which include a threaded mechanism (rather than a spring) to extend and retract a spreader bar between the prongs or jaws of the fastener. Rotation of the threaded mechanism in a first direction (e.g., clockwise) retracts the spreader bar into the prongs or jaws, which separates step-cut locks of the prongs or jaws. Further rotation of the threaded mechanism in the first direction squeezes the workpieces in between the step-cut lock area and the cylindrical body of the fastener. Rotation of the threaded mechanism in an opposing second direction (e.g., counterclockwise) extends the spreader bar out from between the prongs or jaws, which allows the step-cut locks of the prongs or jaws to come together. Fasteners of this type can pull parts together more tightly than the spring-type of the first variation.

Referring generally to FIG. 1, in one or more examples, the tool 100 includes a number of components, including one or more of a body 102 having an opening 104, a plurality of grips 106, a plurality of lugs 108, a cam 110, and a ring 140.

To install the fastener 150, a portion of the fastener 150, such as a head or stem 152 (FIGS. 7 and 8) of an internal threaded shaft, is received in the opening 104 of the tool 100. With the fastener 150 in the opening 104, the stem 152 is positioned between the grips 106, which are arranged around the opening 104. At least one of the grips 106 is radially movable relative to the opening 104. The one or more of the grips 106 that is radially movable may also be referred to as a movable grip or as a radially movable one of the grips 106. The one or more of the grips 106 that is not radially movable may also be referred to as a fixed grip or as a fixed one of the grips 106.

Rotation of the ring 140 in a first rotational direction 112 (e.g., clockwise) relative to the body 102 causes the cam 110 to engage the radially movable one of the grips 106. Further rotation of the ring 140 relative to the body 102 moves the cam 110 relative to the radially movable one of the grips 106, which, in turn, moves (e.g., drives or pushes) the radially movable one of the grips 106 in a radially inward direction toward the opening 104 and, thus, the stem 152 of the fastener 150 to lock or clamp down on the stem 152 of the fastener 150 between the grips 106. With the grips 106 clamped down around the stem 152 of the fastener 150, still further rotation of the ring 140 rotates the body 102, which, in turn, rotates the internal threaded shaft of the fastener 150 to spread the prongs or jaws of the fastener 150 and to squeeze a workpiece in between step-cut locks of the prongs or jaws and the cylindrical body of the fastener 150.

To remove the tool 100 from the fastener 150 after installation of the fastener 150, the ring 140 is rotated in a second rotational direction, opposite the first rotational direction 112, (e.g., counterclockwise). Rotation of the ring 140 relative to the body 102 in the second rotational direction moves the cam 110 relative to the radially movable one of the grips 106 and disengages the cam 110 from the radially movable one of the grips 106, which, in turn, unlocks or unclamps the fastener 150 from between the grips 106 and permits body 102 to rotate freely relative to the fastener 150. The tool 100 can then be removed from the fastener 150.

To remove the fastener 150, the tool 100 is inverted or flipped over and a portion of the fastener 150, such as the head or stem 152 (FIGS. 7 and 8) of the internal threaded shaft, is received in the opening 104 of the tool 100. With the fastener 150 in the opening 104, the stem 152 is positioned between the grips 106, which are arranged around the opening 104. Rotation of the ring 140 in the second rotational direction (e.g., counterclockwise) relative to the body 102 causes the cam 110 to engage the radially movable one of the grips 106. Further rotation of the ring 140 relative to the body 102 moves the cam 110 relative to the radially movable one of the grips 106, which, in turn, moves (e.g., drives or pushes) the radially movable one of the grips 106 in a radially inward direction toward the opening 104 and, thus, the stem 152 of the fastener 150 to lock or clamp down on the stem 152 of the fastener 150 between the grips 106. With the grips 106 clamped down around the stem 152 of the fastener 150, still further rotation of the ring 140 rotates the body 102, which, in turn, rotates the internal threaded shaft of the fastener 150 to release the workpiece from in between step-cut locks of the prongs or jaws and the cylindrical body of the fastener 150 and to close the prongs or jaws of the fastener 150.

Referring to FIGS. 1 and 3-13, the following are examples of the tool 100, according to the present disclosure. In various illustrative examples, the tool 100 includes a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Referring to FIGS. 1 and 3-13, in one or more examples, the tool 100 includes the body 102, the grips 106, the lugs 108, and the cam 110. The body 102 includes the opening 104 having a center axis 116. The grips 106 are coupled to the body 102. The grips 106 are angularly spaced apart from each other around the opening 104. At least one of the grips 106 is radially movable relative to the opening 104. The lugs 108 are coupled to the body 102. The lugs 108 limit radially inward movement of the at least one of the grips 106. The cam 110 is coupled to the body 102. Rotation of the cam 110 about the center axis 116 in the first rotational direction 112 relative to the body 102 moves the at least one of the grips 106 radially inward.

Figure 3:
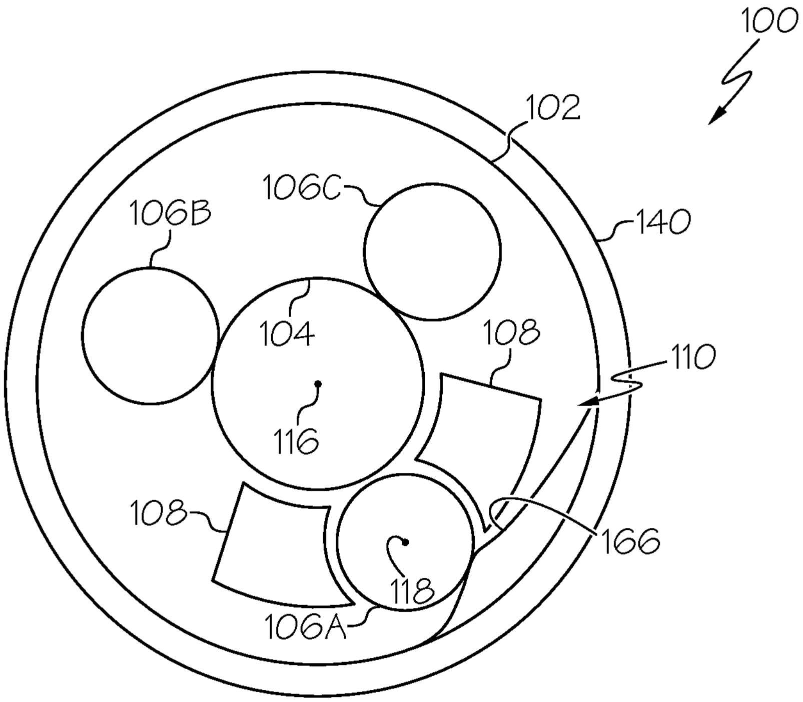
FIG. 3 is a schematic illustration of an example of the tool.
Figure 4:
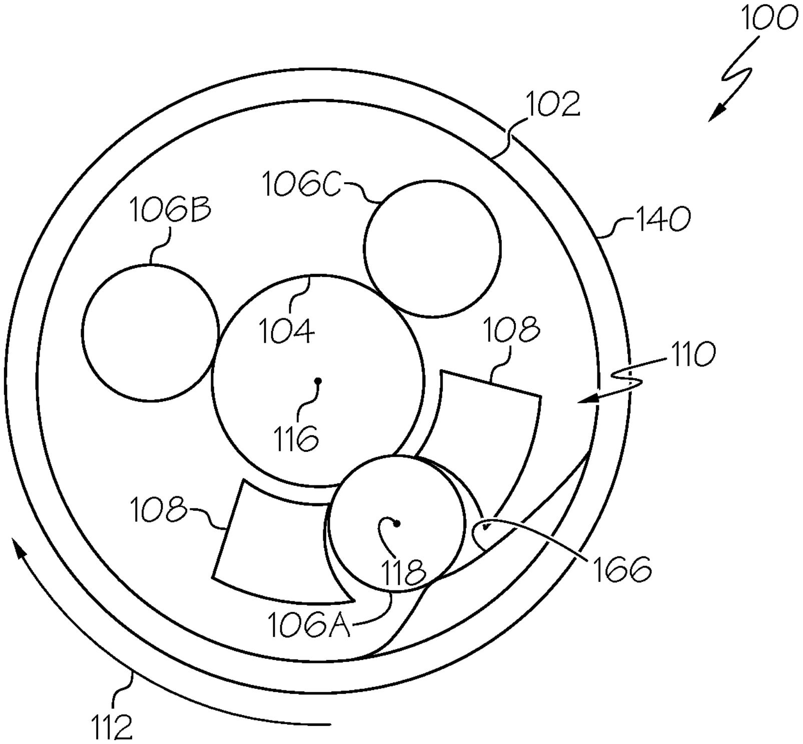
FIG. 4 is a schematic illustration of an example of the tool.
Figure 5:
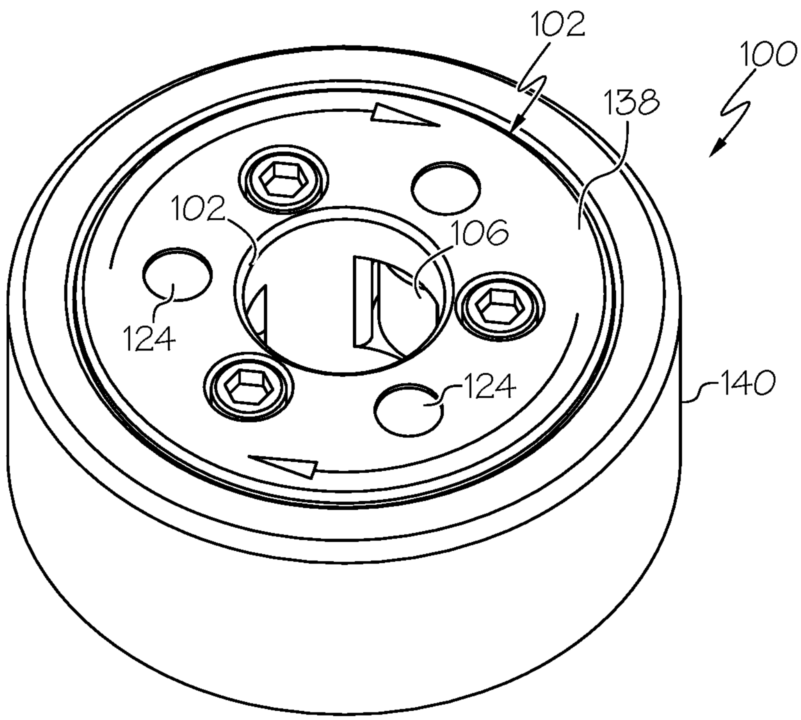
FIG. 5 is a schematic, perspective view of an example of the tool.
Figure 6:
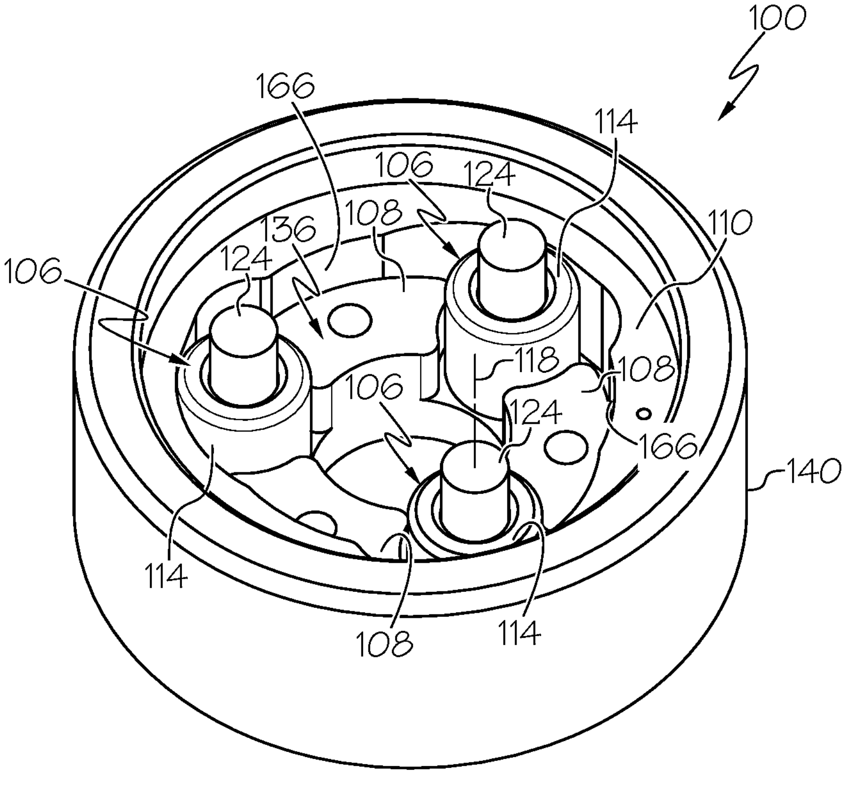
FIG. 6 is a schematic, perspective view of an example of a portion of the tool.

As illustrated in FIGS. 3 and 4, at least one of the grips 106 (e.g., a movable grip 106A) is movable relative to the body 102 and the opening 104 in a radially inward direction (e.g., toward the center of the opening 104) and in a radially outward direction (e.g., away from the center of the opening 104). In the example illustrated in FIGS. 3 and 4, two of the grips 106 (e.g., fixed grips 106B and 106C) are fixed relative to the body 102 and the opening 104 and do not move in the radial directions. In one or more examples, each radially movable one of the grips 106 is inwardly movable until at least a portion of the radially movable one of the grips 106 enters the opening 104 (e.g., at least a portion of the radially movable grip 106A overlaps the opening 104 when viewed along the center axis 116 as shown in FIG. 4).

FIGS. 7 and 8 schematically illustrate examples of the tool 100 applied to an example of the fastener 150. In FIG. 8, a portion of the body 102 (e.g., a second frame 138) is removed for clarity. In one or more examples, the dimension (e.g., diameter) of the opening 104 is slightly larger than the cross-sectional dimension (e.g., diameter) of the portion of the threaded mechanism (e.g., the stem 152) of the fastener 150 to be received in the opening 104. For example, the opening 104 is sized to permit a clearance fit or fixed fit with the fastener 150. In examples where at least one of the grips 106 is fixed relative to the body 102 and the opening 104 (i.e., fixed grips 106B and/or 106C are not radially movable), a portion of the surface of the fixed one of the grips 106 is directly adjacent to or intersects a perimeter of the opening 104, as illustrated in FIGS. 3 and 4.

As illustrated in FIGS. 3, 4, 8, 9 and 14, in one or more examples, the lugs 108 form a physical barrier or stop, which limits the radially inward movement of an associated movable one of the grips 106. As such, the lugs 108 retain the movable one of the grips 106 within the body 102 and prevent the movable one of the grips 106 from escaping (e.g., falling out) of the tool 100 and becoming foreign object debris.

Figure 9:
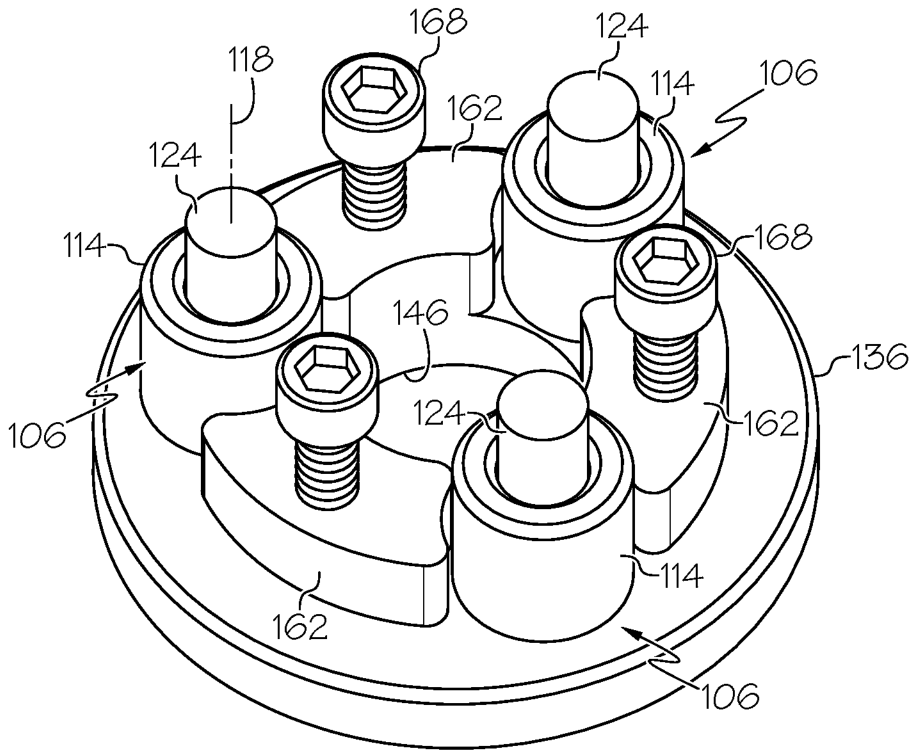
FIG. 9 is a schematic, perspective view of an example of a portion of a body of the tool.
Figure 12:
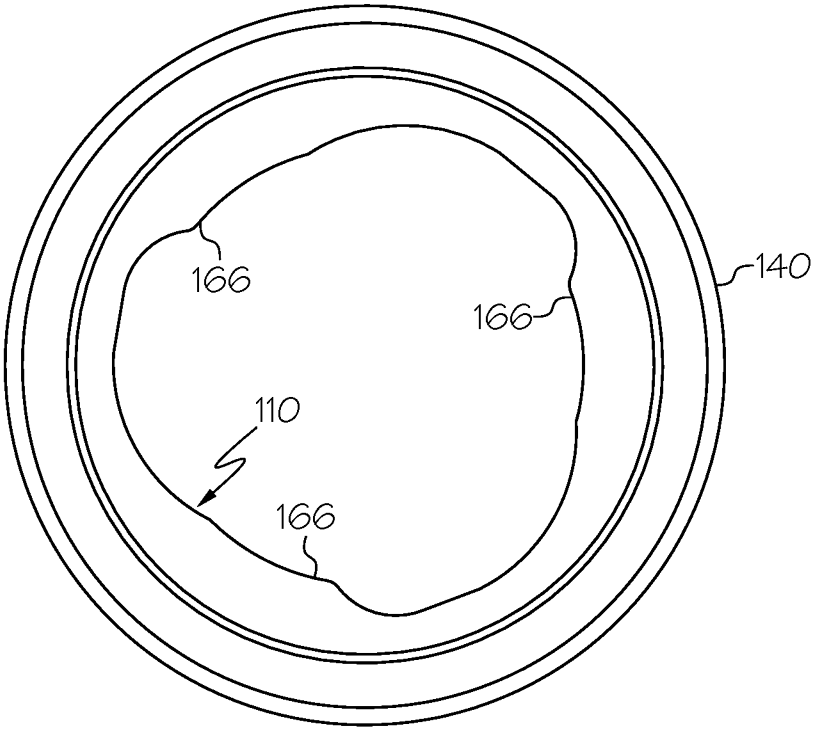
FIG. 12 is a schematic, orthogonal view of an example of a ring and cam of the tool.

As illustrated in FIGS. 3, 4, and 12, in one or more examples, the cam 110 includes a cam surface 166 that engages or disengages each movable one of the grips 106 (e.g., movable grip 106A in FIGS. 3 and 4) in response to rotation of the ring 140 about the center axis 116 relative to the body 102. In examples in which more than one of the grips 106 is radially movable relative to the opening 104 (e.g., as illustrated in FIG. 9), a portion of the cam surface 166 is associated with or corresponds to each of the movable ones of the grips 106 (e.g., as illustrated in FIG. 12). Generally, the cam surface 166 includes a ramped section that is positioned closer to the opening 104 of the body 102, which is configured to push the movable one of the grips 106 radially inward, and a dipped section the is positioned farther from the opening 104, which is configured to permit the movable one of the grips 106 to freely move radially outward.

Referring to FIGS. 1 and 5-12, in one or more examples of the tool 100, at least two of the grips 106 are radially movable relative to the opening 104. The lugs 108 limit radially inward movement of the at least two of the grips 106. Rotation of the cam 110 in the first rotational direction 112 relative to the body 102 moves the at least two of the grips 106 radially inward.

Referring to FIGS. 1 and 5-12, in one or more examples of the tool 100, an entirety of the grips 106 is radially movable relative to the opening 104. The lugs 108 limit radially inward movement of the entirety (i.e., all) of the grips 106. Rotation of the cam 110 in the first rotational direction 112 relative to the body 102 moves the entirety of the grips 106 radially inward.

In the illustrated examples, the tool 100 includes three of the grips 106. However, in other examples, the tool 100 can include only two of the grips 106 or can include four or more of the grips 106. In the examples illustrated in FIGS. 3 and 4, one of the grips 106 is radially movable (e.g., movable grip 106A) and two of the grips 106 are fixed (e.g., fixed grips 106B and 106C). In the examples illustrated in FIGS. 6, 8 and 9, all three of the grips 106 are radially movable.

Referring to FIGS. 1, 3-9 and 13, in one or more examples of the tool 100, at least one of or each one of the grips 106 is rotatable about the rotation axis 118 (FIGS. 4, 6, 9 and 13). The rotation axis 118 is at least approximately parallel to the center axis 116. Generally, the grips 106 that are rotatable about the rotation axis 118 are the radially movable ones of the grips 106 (e.g., the rotatable ones of the grips 106 are also radially movable relative to the opening 104). However, in other examples, the grips 106 that are rotatable about the rotation axis 118 are the fixed ones of the grips 106 (e.g., the rotatable ones of the grips 106 are fixed relative to the opening 104). In still other examples, both the fixed ones of the grips 106 and the radially movable ones of the grips 106 are rotatable about the rotation axis 118.

Referring to FIGS. 1 and 3-14, in one or more examples of the tool 100, at least one of or each one of the grips 106 (e.g., the radially movable ones and/or the fixed ones) includes or takes the form of a roller 114. In these examples, the roller 114 rotates about the rotation axis 118. In one or more examples, the radially movable ones of the grips 106 and/or the fixed ones of the grips 106 include the roller 114.

Referring to FIGS. 1 and 3-14, in one or more examples of the tool 100, the roller 114 is a cylindrical roller 120. In these examples, the rotation axis 118 extends though the length of the cylindrical roller 120 and the cylindrical roller 120 rotates about the rotation axis 118. In other examples, the radially movable ones of the grips 106 and/or the fixed ones of the grips 106 can include or take the form of other roller structures, such as spherical rollers and the like.

Referring to FIGS. 1 and 3-14, in one or more examples of the tool 100, the roller 114 is a tubular roller 122. In these examples, the rotation axis 118 extends though the length of the tubular roller 122 and the tubular roller 122 rotates about the rotation axis 118.

Referring to FIGS. 1 and 3-14, in one or more examples of the tool 100, at least one of or each one of the grips 106 also includes a pin 124 that is coupled to the body 102. In these examples, the tubular roller 122 is rotatable about the pin 124. The pin 124 extends along or is centered on the rotation axis 118. In one or more examples, the tubular roller 122 is linearly moveable relative to the pin 124. As example, the tubular roller 122 is linearly movable relative to the pin 124 in a radial direction relative to the center axis 116 (e.g., in the radially inward and radially outward directions relative to the opening 104). As another example, the tubular roller 122 is linearly movable relative to the pin 124 along the rotation axis 118.

Figure 13:
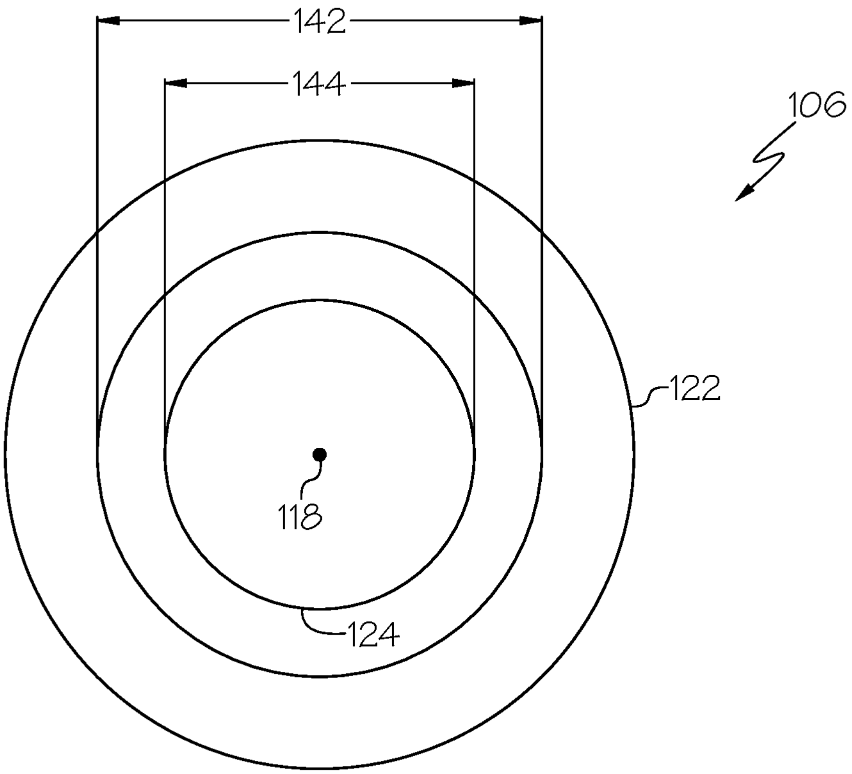
FIG. 13 is a schematic illustration of an example of a grip.

Referring generally to FIGS. 1 and 3-12 and particularly to FIG. 13, which illustrates an example of one of the grips 106, which includes the tubular roller 122 and the pin 124. In one or more examples of the tool 100, the tubular roller 122 has an inner diameter 142. The pin 124 has a diameter 144. As illustrated in FIG. 13, the diameter 144 of the pin 124 is less than the inner diameter 142 of the tubular roller 122. The difference between the diameter 144 of the pin 124 and the inner diameter 142 of the tubular roller 122 enables the tubular roller 122 to move radially inward and radially outward relative to the pin 124 in response to engagement of the cam 110 and movement of the cam 110 relative to the tubular roller 122.

Figure 14:
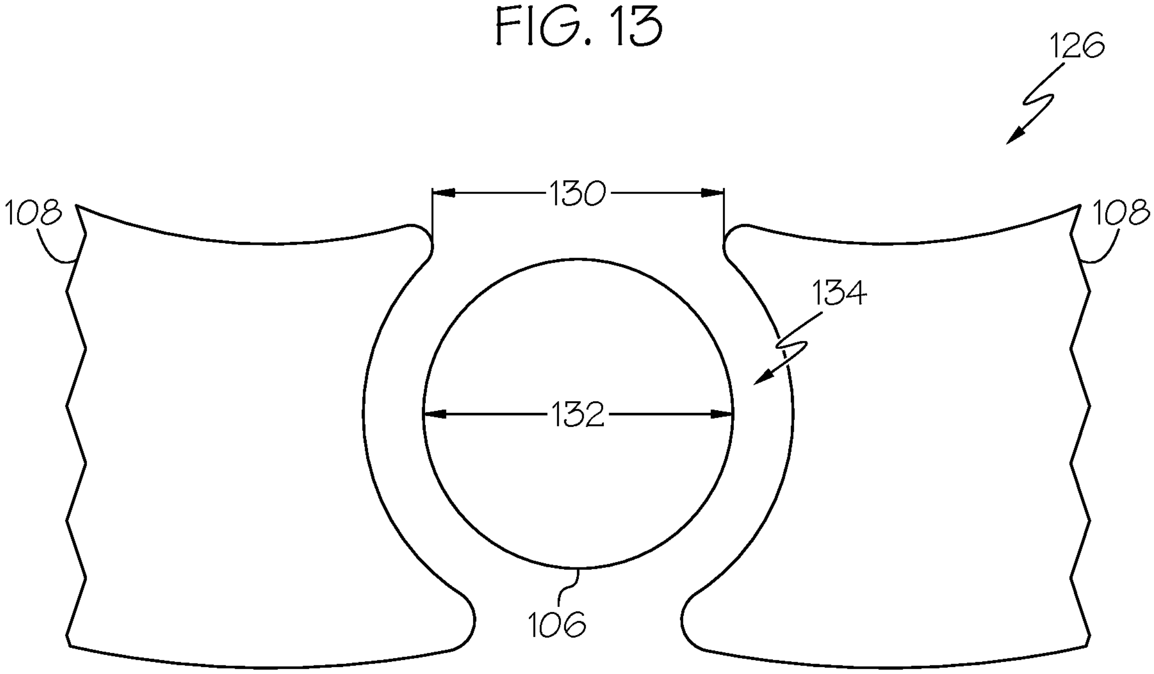
FIG. 14 is a schematic illustration of an example of a grip and lugs.

Referring generally to FIGS. 1 and 3-13 and particularly to FIG. 14, which illustrates an example of one of the grips 106 with an associated pair of the lugs 108. In one or more examples of the tool 100, the plurality of lugs 108 includes at least one lug pair 126 that is associated with at least one of the grips 106. At least one of the grips 106 is located between the lug pair 126. A dimension 130 between the lug pair 126 is less than a cross-sectional dimension 132 of the at least one of the grips 106.

As illustrated in FIG. 14, the dimension 130 between the lugs 108 of the lug pair 126 generally refers to the smallest dimension between the lugs 108 of the lug pair 126, which is closest to the opening 104. Each of the movable ones of the grips 106 has a corresponding lug pair 126. The dimension 130 between the lug pair 126 (e.g., the directly adjacent pair of the lugs 108) being less than the cross-sectional dimension 132 of the movable one of the grips 106 associated with and retained by the lug pair 126 prevents the movable one of the grips 106 from escaping the body 102 during use of the tool 100.

Referring to FIGS. 1 and 3-14, in one or more examples of the tool 100, each one of the grips 106 is equally angularly spaced apart from a directly adjacent one of the grips 106 around the opening 104. In one or more examples, each pair of the lugs 108 (e.g., each lug pair 126) is equally angularly spaced apart from a directly adjacent pair of the lugs 108 (e.g., directly adjacent lug pair 126).

Referring to FIGS. 1 and 3-14, in one or more examples of the tool 100, the body 102 includes a first frame 136 and the second frame 138. The second frame 138 is coupled to the first frame 136. The grips 106 and the lugs 108 are disposed between the first frame 136 and the second frame 138.

Figure 10:
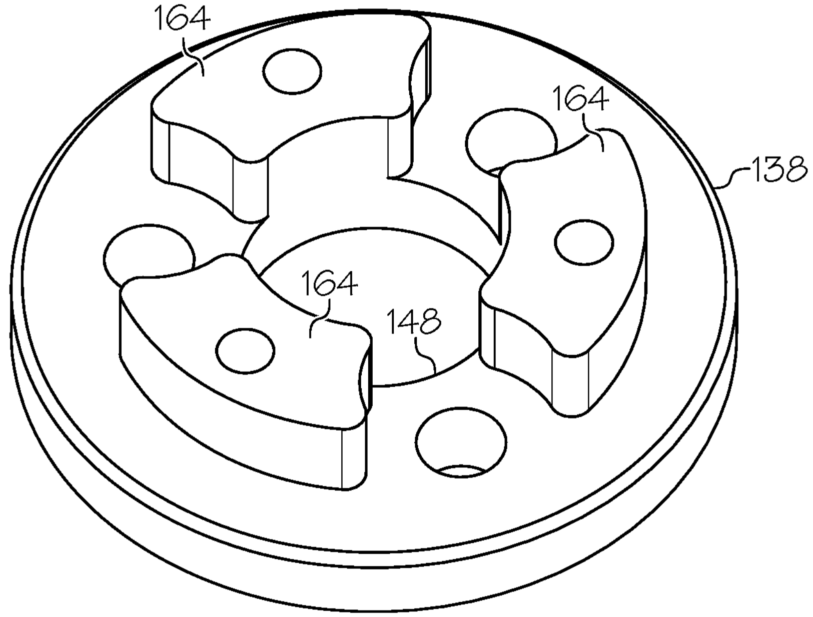
FIG. 10 is a schematic, perspective view of an example of a portion of the body of the tool.
Figure 11:
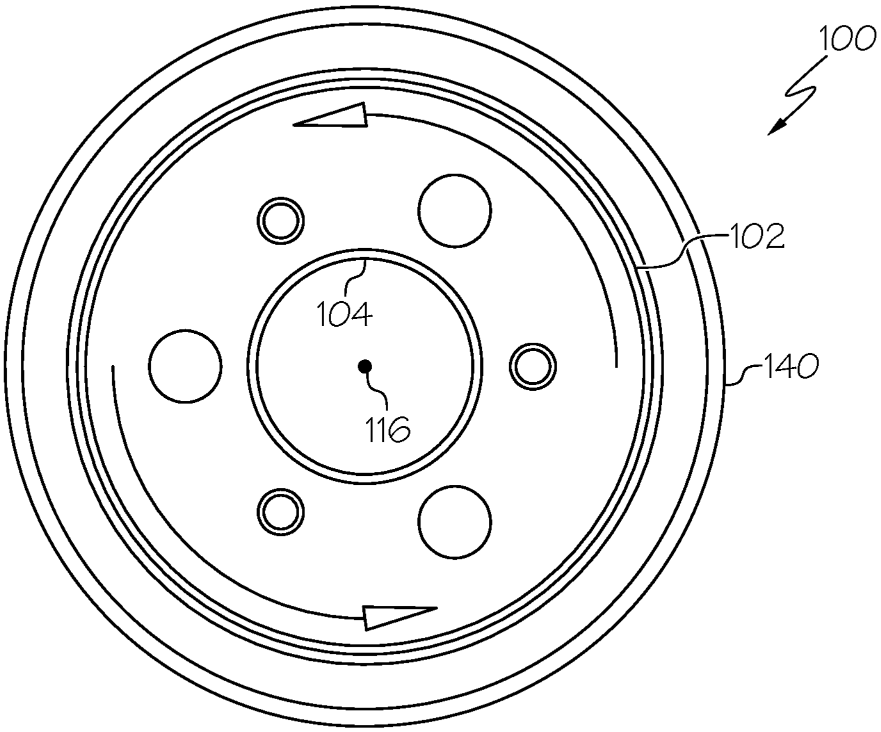
FIG. 11 is a schematic, orthogonal view of an example of the tool.

Referring to FIG. 9, which illustrates an example of the first frame 136, and FIG. 10, which illustrates an example of the second frame 138. In one or more examples, each one of the grips 106 extends between and/or is coupled to the first frame 136 and the second frame 138. In one or more examples of the grips 106 (e.g., the movable ones and/or the fixed ones), the roller 114, such as the cylindrical roller 120, extend between the first frame 136 and the second frame 138. In one or more examples of the grips 106 (e.g., the movable ones), the roller 114, such as the cylindrical roller 120, is rotatable about the rotation axis 118 relative to the first frame 136 and the second frame 138. For example, the first frame 136 and the second frame 138 include recesses that receive and retain opposing ends of the roller 114. In one or more examples of the grips 106 (e.g., the movable ones and/or the fixed ones), the pin 124 extends between and/or is coupled to the first frame 136 and the second frame 138. For example, the first frame 136 and the second frame 138 include recesses that receive and retain opposing ends of the pin 124. The tubular roller 122 is situated on the pin 124 between the first frame 136 and the second frame 138. In these examples, the pin 124 serves as a primary retention feature for the roller 114 and the grips 106 of the lug pair 126 serve as a secondary retention feature in cases where the pin 124 may fail.

As illustrated in FIGS. 9 and 10, in one or more examples, each one of the lugs 108 extends between and/or is coupled to the first frame 136 and the second frame 138. In one or more examples, at least one of the lugs 108 is continuous or is formed by a unitary body. In other examples, such as illustrated in FIGS. 9 and 10, at least one of the lugs 108 is discontinuous or is formed by multiple segments.

As illustrated in FIGS. 9 and 10, in one or more examples of the tool 100, the first frame 136 and the second frame 138 are coupled or otherwise joined together using a plurality of fasteners 168.

Referring to FIGS. 1 and 3-14, in one or more examples, the tool 100 includes the ring 140. The ring 140 is coupled to the body 102. The ring 140 is concentric with the body 102. The ring 140 is rotatable about the center axis 116 relative to the body 102. Rotation of the ring 140 about the center axis 116 in turn moves the cam 110 relative to the movable ones of the grips 106. In one or more examples, the cam 110 is coupled to the ring 140. In these examples, Rotation of the ring 140 about the center axis 116 in turn rotates the cam 110 about the center axis 116. At least a portion of the cam surface 166 of the cam 110 extends or projects radially inward from the ring 140 toward the opening 104 of the body 102. As such, rotation of the ring 140 moves the radially inward section of the cam surface 166 of the cam 110 into engagement with the movable one of the grips 106, which, in turn, pushes the movable one of the grips 106 in the radially inward direction to engage the fastener 150. In the example illustrated in FIG. 12, the cam 110 includes three sections of the cam surface 166, which are associated with the three movable ones of the grips 106 (e.g., as illustrated in FIG. 9).

In various examples, the ring 140 can have any outer shape (e.g., two-dimensional shape viewed along the center axis 116. The outer shape of the ring 140 can be selected or configured to enable use of a secondary tool (e.g., wrench or pliers) or the hand of an operator. In one or more examples, the ring 140 has a circular shape (e.g., as illustrated). In one or more examples, the ring 140 has a polygonal shape, such as a hexagonal shape. In one or more examples, the ring 140 has an ovular or elliptical shape. Other shapes for the ring 140 are also contemplated.

Referring to FIGS. 1 and 3-14, in one or more examples, the tool 100 includes the body 102. The body 102 includes the center axis 116, the first frame 136, and the second frame 138. The first frame 136 includes a first opening 146. The first opening 146 is concentric with the center axis 116. The second frame 138 is coupled to the first frame 136. The second frame 138 includes a second opening 148. The second opening 148 is concentric with the center axis 116. In other words, the first opening 146 and the second opening 148 are axially aligned along the center axis 116 and, in combination, form the opening 104 of the body 102. The tool 100 includes the plurality of grips 106. The grips 106 are disposed between the first frame 136 and the second frame 138. The grips 106 are angularly spaced apart from each other around the center axis 116. The tool 100 includes the plurality of lugs 108. The lugs 108 extend between the first frame 136 and the second frame 138. The tool 100 includes the ring 140. The ring 140 is coupled to the body 102. The ring 140 is concentric with the center axis 116. The tool 100 includes the cam 110. The cam 110 is coupled to the ring 140. The cam 110 extends radially inward. The grips 106 are radially movable relative to the center axis 116. The lugs 108 limit radially inward movement of the grips 106. The ring 140 is rotatable about the center axis 116 relative to the body 102. Rotation of the ring 140 about the center axis 116 in the first rotational direction 112 relative to the body 102 engages the cam 110 with the grips 106 to moves the grips 106 radially inward.

Referring to FIGS. 1 and 3-14, in one or more examples of the tool 100, the lugs 108 includes a plurality of first lugs 162. The first lugs 162 are coupled to the first frame 136. The first lugs 162 are angularly spaced apart from each other around the first opening 146. The lugs 108 also includes a plurality of second lugs 164. The second lugs 164 are coupled to the second frame 138. The second lugs 164 are angularly spaced apart from each other around the second opening 148. In these examples, one of the first lugs 162 and one of the second lugs 164, in combination, form one of the lugs 108 when the first frame 136 and the second frame 138 are coupled together.

Referring to FIGS. 1 and 3-14, in one or more examples of the tool 100, at least one or each one of the grips 106 (e.g., radially movable ones) is disposed between a directly adjacent pair of the lugs 108 (e.g., the lug pair 126).

Referring to FIGS. 1 and 3-14, in one or more examples of the tool 100, a directly adjacent pair of the lugs 108 (e.g., the lug pair 126) forms a pocket 134. The pocket 134 is configured (e.g., shaped, sized, etc.) to contain an associated one of the grips 106 (e.g., a movable one).

Figure 2:
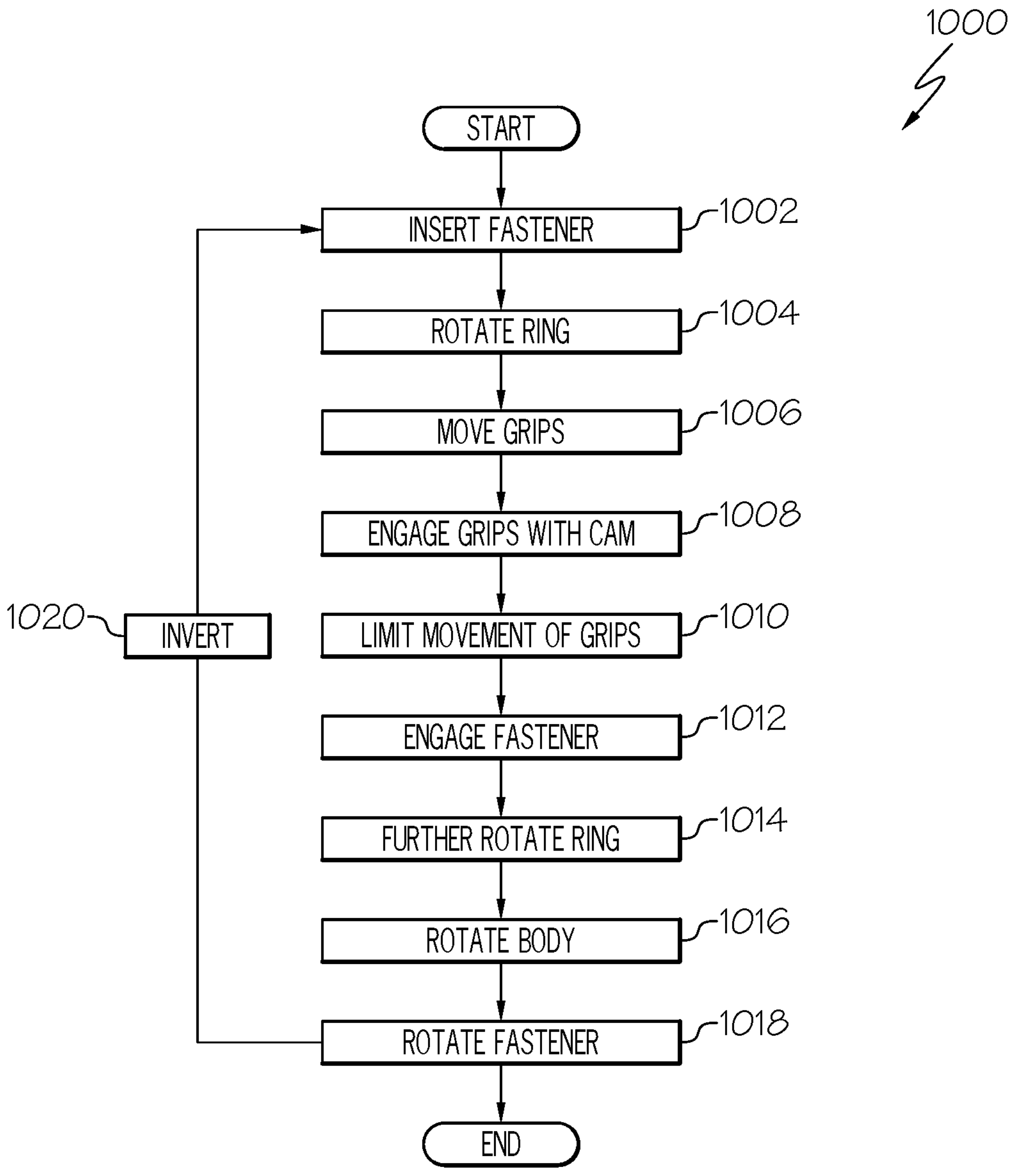
FIG. 2 is a flow diagram of an example of a method for installing and removing fasteners.

Referring to FIG. 2, the following are examples of the method 1000 for installing and removing the fastener 150, according to the present disclosure. In one or more examples, the method 1000 is implemented using the tool 100 (FIG. 1). The method 1000 includes a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

Generally, the examples of the tool 100 and the method 1000 disclosed herein are designed to allow more installation compliance onto a shaft (e.g., stem 152 or head) of the fastener 150 and removal from the shaft without stripping the roller element (e.g., rotatable ones of the grips 106, such as the roller 114) from tool 100, which may become foreign object debris (FOD). The design is configured to retain the grips 106 and prevent accidental escapement the grips 106 and/or the pin 124 (e.g., FOD prevention is a primary advantage of the tool 110). Also, examples of the tool 100 and the method 1000 disclosed herein are designed such that the tool 100 does not require lubrication, which may collect debris. In various examples, the tool 100 can be cleaned by ultrasonic cleaning or other means. In one or more examples, the tool 100 and the method 1000 can be used to lock or power other shaft type mechanical components. In various examples, the design of the tool 100 can be scaled and/or sized according to use requirements.

Referring generally to FIGS. 1 and 3-14 and particularly to FIG. 2, in one or more examples, the method 1000 includes a step of inserting 1002 a portion of the fastener 150 in the opening 104 of the body 102 of the tool 100. The method 1000 includes a step of rotating 1004 the ring 140 relative to the body 102 in the first rotational direction 112 about the center axis 116 of the tool 100. The ring 140 is coupled to and is concentric with the body 102. The method 1000 includes a step of moving 1006 the plurality of grips 106 radially inward in response to rotating 1004 the ring 140. The grips 106 are coupled to the body 102 and are angularly spaced apart from each other around the opening 104. The method 1000 includes a step of engaging 1012 the portion of the fastener 150 (e.g., received by the opening 104) with the grips 106 in response to moving 1006 the grips 106. With the grips 106 engaged with the portion of the fastener 150, the method 1000 includes a step of further rotating 1014 the ring 140 in the first rotational direction 112 about the center axis 116. The method 1000 includes a step of rotating 1016 the body 102 in the first rotational direction 112 about the center axis 116 in response to further rotating 1014 the ring 140. The method 1000 includes a step of rotating 1018 the fastener 150 in response to rotating 1016 the body 102.

Referring generally to FIGS. 1 and 3-14 and particularly to FIG. 2, in one or more examples, the method 1000 includes a step of limiting 1010 radially inward movement of the grips 106 using the plurality of lugs 108. The lugs 108 are coupled to the body 102 and are angularly spaced apart from each other around the opening 104. Each one of the grips 106 is disposed between a directly adjacent pair of the lugs 108.

Referring generally to FIGS. 1 and 3-14 and particularly to FIG. 2, in one or more examples, according to the method 1000, moving 1006 the grips 106 radially inward in response to rotating 1004 the ring 140 includes a step of engaging 1008 the grips 106 with the cam 110. The cam 110 extends radially inward from the ring 140.

In one or more examples, the tool 100 is flipped or inverted and the method 1000 is repeated with rotation in the second rotational direction to remove the fastener 150. As an example, the method 1000 includes a step of inverting 1020 the tool 100 and the method 1000 returns to installing the tool 100 on the fastener 150 (e.g., the step of inserting 1002). The operational steps of the method 1000 are repeated with the steps of rotating 1004, 1014, 1016, and 1018 being in the second rotational direction.

Figure 15:
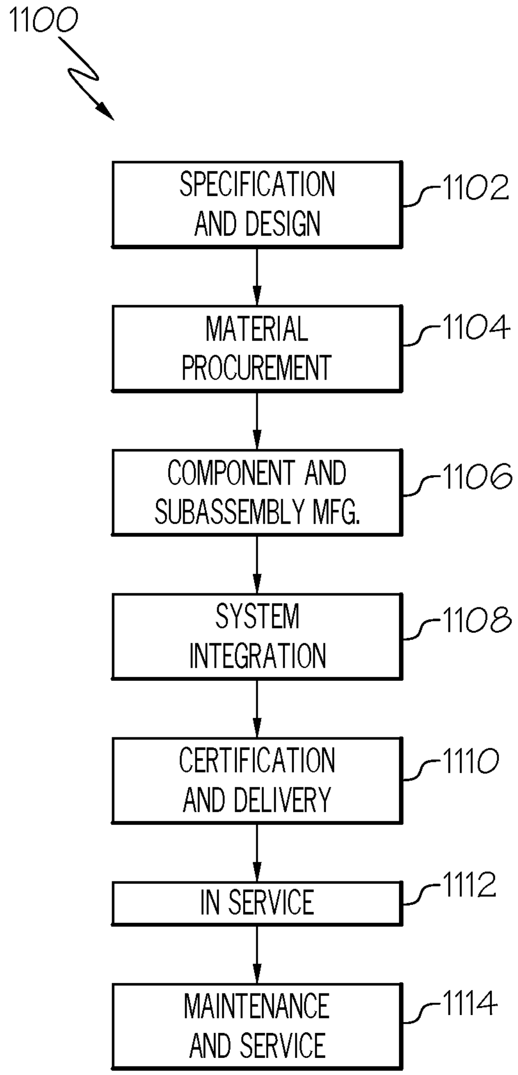
FIG. 15 is a flow diagram of an example of an aircraft manufacturing and service method.
Figure 16:
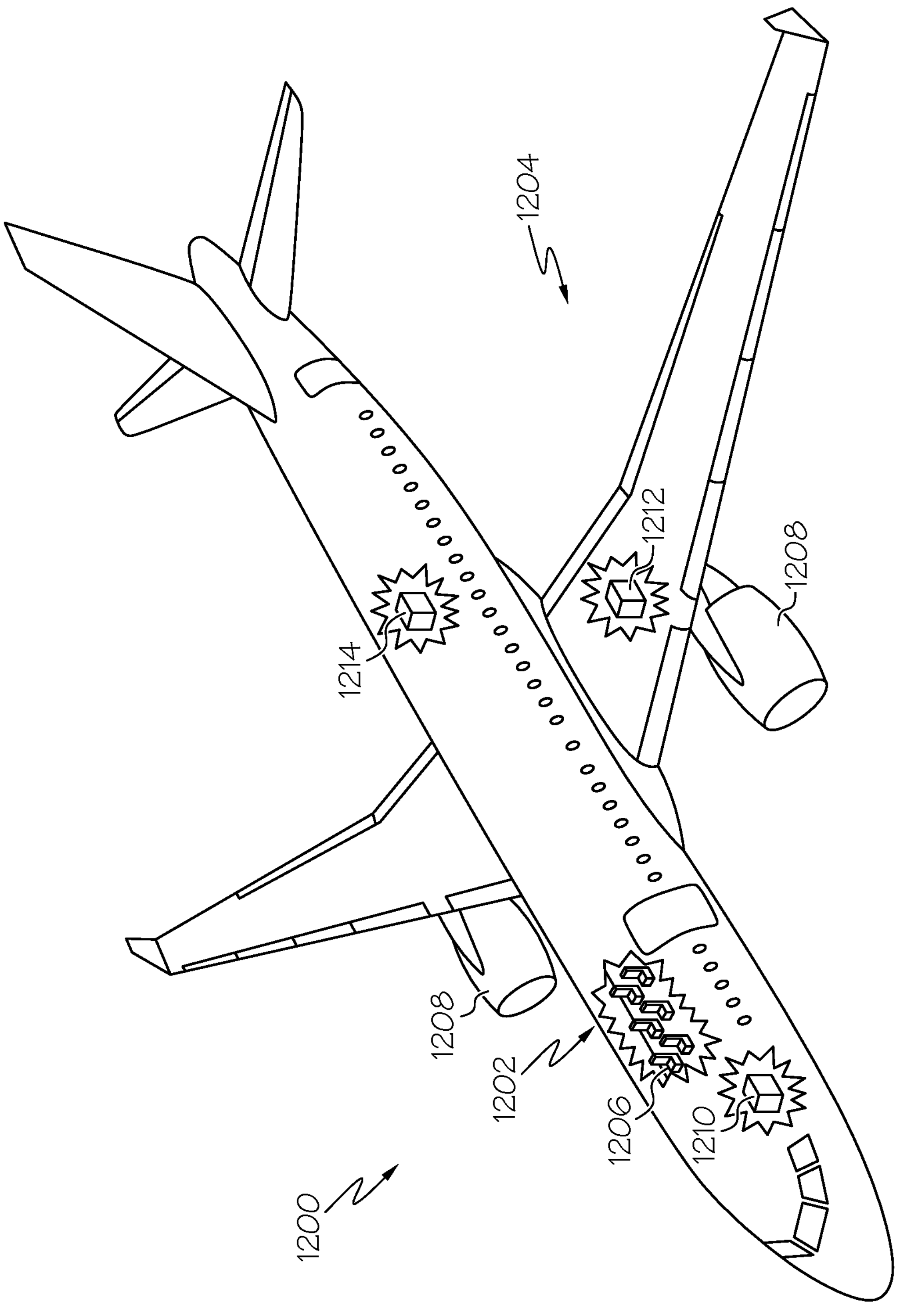
FIG. 16 is a schematic illustration of an example of an aircraft.

Referring now to FIGS. 15 and 16, examples of the tool 100 and the method 1000 described herein, may be related to, or used in the context of, the aerospace manufacturing and service method 1100, as shown in the flow diagram of FIG. 15 and an aircraft 1200, as schematically illustrated in FIG. 16. As an example, the aircraft 1200 and/or the manufacturing and service method 1100 may include or utilize fasteners (e.g., fastener 150) that are installed and/or removed using the tool 100 and/or according to the method 1000.

Referring to FIG. 16, which illustrates an example of the aircraft 1200. The aircraft 1200 can be any aerospace vehicle or platform. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems 1216, such as, but not limited to, communications systems, avionics systems, software distribution systems, network communications systems, passenger information/entertainment systems, guidance systems, radar systems, weapons systems, and the like.

Referring to FIG. 15, during pre-production of the aircraft 1200, the manufacturing and service method 1100 includes specification and design (1102) of the aircraft 1200 and material procurement (1104). During production of the aircraft 1200, component and subassembly manufacturing (1106) and system integration (1108) of the aircraft 1200 take place. Thereafter, the aircraft 1200 goes through certification and delivery (1110) to be placed in service (1112). Routine maintenance and service (1114) includes modification, reconfiguration, refurbishment, etc. of one or more systems of the aircraft 1200.

Each of the processes of the manufacturing and service method 1100 illustrated in FIG. 15 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the tool 100 and the method 1000, shown and described herein, may be employed during any one or more of the stages of the manufacturing and service method 1100 shown in the flow diagram illustrated by FIG. 15. In an example, components of the aircraft 1200 can be coupled or otherwise joined together (temporarily or permanently) using fasteners that are installed and/or removed using the tool 100 and/or according to the method 1000 during a portion of component and subassembly manufacturing (1106) and/or system integration (1108). Further, components of the aircraft 1200 can be coupled or otherwise joined together (temporarily or permanently) using fasteners that are installed and/or removed using the tool 100 and/or according to the method 1000 while the aircraft 1200 is in service (1112). Also, components of the aircraft 1200 can be coupled or otherwise joined together (temporarily or permanently) using fasteners that are installed and/or removed using the tool 100 and/or according to the method 1000 during system integration (1108) and certification and delivery (1110). Similarly, components of the aircraft 1200 can be coupled or otherwise joined together (temporarily or permanently) using fasteners that are installed and/or removed using the tool 100 and/or according to the method 1000 while the aircraft 1200 is in service (1112) and during maintenance and service (1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1, 3-14 and 16, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1, 3-14 and 16, referred to above, need be included in every example and not all elements, features, and/or components described herein are necessarily depicted in each illustrative example. Accordingly, some of the elements, features, and/or components described and illustrated in FIGS. 1, 3-14 and 16 may be combined in various ways without the need to include other features described and illustrated in FIGS. 1, 3-14 and 16, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1, 3-14 and 16, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1, 3-14 and 16, and such elements, features, and/or components may not be discussed in detail herein with reference to each of FIGS. 1, 3-14 and 16. Similarly, all elements, features, and/or components may not be labeled in each of FIGS. 1, 3-14 and 16, but reference numerals associated therewith may be utilized herein for consistency.

In FIGS. 2 and 15, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 2 and 15 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the tool 100 and the method 1000 have been shown and described, modifications may occur to those skilled in the art upon reading the specification. The present application includes such modifications and is limited only by the scope of the claims.

What is claimed is:

1. A tool comprising:

a body comprising;

a first frame comprising a first opening concentric to a center axis;

a second frame coupled to the first frame and comprising a second opening concentric to the center axis; and a ring disposed circumferentially about the first frame and the second frame;

a plurality of grips extending between the first frame and the second frame and angularly spaced apart from each other around the first opening and the second opening, wherein at least one of the grips is radially movable relative to the center axis;

a plurality of lugs extending between the first frame and the second frame, wherein the lugs limit radially inward movement of the at least one of the grips; and a cam extending radially inward from the ring and positioned between the first frame and the second frame, wherein rotation of the cam about the center axis in a first rotational direction moves the at least one of the grips radially inward.

2. The tool of claim 1, wherein:

at least two of the grips are radially movable relative to the center axis;

the plurality of lugs limits radially inward movement of the at least two of the grips; and rotation of the cam about the center axis in the first rotational direction moves the at least two of the grips radially inward.

3. The tool of claim 1, wherein:

an entirety of the grips is radially movable relative to the center axis;

the plurality of lugs limits radially inward movement of the entirety of the grips; and rotation of the cam about the center axis in the first rotational direction moves the entirety of the grips radially inward.

4. The tool of claim 1, wherein the at least one of the grips is rotatable about a rotation axis that is parallel to the center axis.

5. The tool of claim 1, wherein the at least one of the grips comprises a roller.

6. The tool of claim 1, wherein the at least one of the grips comprises a cylindrical roller.

7. The tool of claim 1, wherein at least one of the grips comprises a tubular roller.

8. The tool of claim 1, wherein the at least one of the grips comprises:

a pin that is coupled to the body extending between the first frame and the second frame; and a tubular roller concentric to and rotatable relative to the pin about a rotation axis that is parallel to the center axis.

9. The tool of claim 8, wherein:

the tubular roller has an inner diameter;

the pin has a diameter;

the diameter of the pin is less than the inner diameter of the tubular roller is linearly movable relative to the pin along the rotation axis and along a radial axis that is perpendicular to the rotation axis.

10. The tool of claim 1, wherein:

the plurality of lugs comprises at least one lug pair associated with the at least one of the grips;

the at least one of the grips is located between the lug pair; and a dimension between the lug pair is less than a cross-sectional dimension of the at least one of the grips.

11. The tool of claim 1, wherein each one of the grips is equally angularly spaced apart from a directly adjacent one of the grips around the opening.

12. The tool of claim 1, wherein:

the ring is rotatable about the center axis relative to the body first frame and the second frame; and the cam is coupled to the ring.

13. A method for installing a fastener using the tool of claim 1, the method comprising:

inserting a portion of the fastener through one of the first opening or the second opening of the tool;

rotating the ring in a first rotational direction about the center axis of the tool;

moving the at least one of grips radially inward in response to rotating the ring;

engaging the portion of the fastener with the grips in response to moving the at least one of the grips;

with the grips engaged with the portion of the fastener, further rotating the ring in the first rotational direction about the center axis;

rotating the first frame and the second frame in the first rotational direction about the center axis in response to further rotating the ring; and rotating the fastener in response to rotating the first frame and the second frame.

14. The method of claim 13, further comprising limiting radially inward movement of the grips using the plurality of lugs, wherein:

the lugs are angularly spaced apart from each other around the first opening and the second opening; and each one of the grips is disposed between a directly adjacent pair of the lugs.

15. The method of claim 13, wherein:

moving the at least one of the grips radially inward in response to rotating the ring comprises engaging the grips with the cam.

16. The tool of claim 1, wherein the first frame and the second frame are coupled together by a plurality of fasteners that extend between the first frame and the second frame.

17. A tool comprising:

a body comprising:

a center axis;

a first frame comprising a first opening that is concentric with the center axis;

a second frame coupled to the first frame and comprising a second opening that is concentric with the center axis; and a ring disposed circumferentially about the first frame and the second frame;

a plurality of pins extending between the first frame and the second frame and angularly spaced apart from each other around the center axis;

a plurality of tubular rollers, wherein each one of the tubular rollers is concentric to and rotatable relative to an associated one of the pins about a respective rotation axis that is parallel to the center axis;

a plurality of lugs extending between the first frame and the second frame; and a cam coupled to the ring and extending radially inward between the first frame and the second frame, wherein:

the tubular rollers are radially movable relative to the center axis;

the lugs limit radially inward movement of the tubular rollers;

the ring is rotatable about the center axis relative to the first frame and the second frame; and rotation of the ring about the center axis in a first rotational engages the cam with the tubular rollers to move the tubular rollers radially inward.

18. The tool of claim 17, wherein each one of the tubular rollers is disposed between a directly adjacent pair of the lugs.

19. The tool of claim 17, wherein the first frame and the second frame are coupled together by a plurality of fasteners that extend between the first frame and the second frame.

20. The tool of claim 17, wherein each one of the tubular rollers is linearly moveable along the respective rotation axis relative to the first frame and the second frame.

* * * * *